(12) United States Patent
Herron et al.

(10) Patent No.: US 12,277,811 B1
(45) Date of Patent: Apr. 15, 2025

(54) REMOTE VEHICLE DIAGNOSTIC SYSTEM AND METHOD

(71) Applicant: Opus IVS, Inc., Dexter, MI (US)

(72) Inventors: Brian J. Herron, Dexter, MI (US);
Michael D. Jurmo, Canton, MI (US);
Richard J. Green, Ann Arbor, MI (US)

(73) Assignee: Opus IVS, Inc., Dexter, MI (US)

( * ) Notice: Subject to any disclaimer, the term of this patent is extended or adjusted under 35 U.S.C. 154(b) by 0 days.

(21) Appl. No.: 18/630,259

(22) Filed: Apr. 9, 2024

Related U.S. Application Data

(62) Division of application No. 16/842,036, filed on Apr. 7, 2020, now Pat. No. 11,954,946.

(51) Int. Cl.
*G07C 5/00* (2006.01)
*G01M 17/007* (2006.01)
*G07C 5/08* (2006.01)

(52) U.S. Cl.
CPC .......... *G07C 5/008* (2013.01); *G01M 17/007* (2013.01); *G07C 5/0808* (2013.01); *G07C 2205/02* (2013.01)

(58) Field of Classification Search
CPC .. G07C 5/008; G07C 5/0808; G07C 2205/02; G01M 17/007
See application file for complete search history.

(56) References Cited

U.S. PATENT DOCUMENTS

| | | | |
|---|---|---|---|
| 6,154,658 | A | 11/2000 | Caci |
| 6,728,603 | B2 | 4/2004 | Pruzan et al. |
| 6,879,894 | B1 | 4/2005 | Lightner et al. |
| 6,956,501 | B2 | 10/2005 | Kitson |

(Continued)

FOREIGN PATENT DOCUMENTS

WO  2004092857 A2  10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

(Continued)

*Primary Examiner* — Austin J Moreau
(74) *Attorney, Agent, or Firm* — Gardner, Linn, Burkhart & Ondersma LLP

(57) ABSTRACT

A method for performing a vehicle diagnostic process for diagnosing, scanning and/or programming a vehicle includes recording a diagnostic message from a diagnostic computer device to generate a recorded diagnostic message, transmitting the recorded diagnostic message to a local computer at a repair facility, with the diagnostic computer device being located remotely from the repair facility, and playing the recorded diagnostic message at the local computer for delivery via an interface device to an electronic system of a vehicle. The method then further includes recording with the local computer a vehicle message from the electronic system of the vehicle to generate a recorded vehicle message in response to playing the recorded diagnostic message, and transmitting the recorded vehicle message from the local computer to the diagnostic computer device.

5 Claims, 3 Drawing Sheets

(56) References Cited

U.S. PATENT DOCUMENTS

| | | |
|---|---|---|
| 7,092,803 B2 | 8/2006 | Kapolka et al. |
| 7,373,226 B1 | 5/2008 | Cancilla et al. |
| 7,502,672 B1 | 3/2009 | Kolls |
| 7,519,458 B2 | 4/2009 | Buckley |
| 7,532,962 B1 | 5/2009 | Lowrey et al. |
| 7,584,030 B1 | 9/2009 | Graham |
| 7,786,851 B2 | 8/2010 | Drew et al. |
| 7,840,812 B1 | 11/2010 | Levenberg |
| 7,928,837 B2 | 4/2011 | Drew et al. |
| 8,190,322 B2 | 5/2012 | Lin et al. |
| 8,259,936 B2 | 9/2012 | Mahalingaiah |
| 8,306,687 B2 | 11/2012 | Chen |
| 8,339,254 B2 | 12/2012 | Drew et al. |
| 8,352,577 B2 | 1/2013 | Martone |
| 8,638,207 B2 | 1/2014 | Drew et al. |
| 8,688,313 B2 | 4/2014 | Margol et al. |
| 8,909,416 B2 | 12/2014 | Chen et al. |
| 8,918,245 B2 | 12/2014 | Dewhurst et al. |
| 9,430,884 B2 | 8/2016 | Drew et al. |
| 9,530,255 B2 | 12/2016 | Drew et al. |
| 9,563,988 B2 | 2/2017 | Drew et al. |
| 9,646,130 B2 | 5/2017 | Drew et al. |
| 10,013,816 B2 | 7/2018 | Nassar et al. |
| 10,146,521 B2 | 12/2018 | West et al. |
| 10,181,225 B2 | 1/2019 | Liebl et al. |
| 10,282,924 B2 | 5/2019 | Drew et al. |
| 10,414,277 B1 | 9/2019 | Herron et al. |
| 10,445,953 B1 | 10/2019 | Herron et al. |
| 10,706,645 B1 | 7/2020 | Herron et al. |
| 10,719,813 B1 * | 7/2020 | Beckmann ............. G06Q 10/20 |
| 10,748,356 B1 | 8/2020 | Herron et al. |
| 11,062,534 B2 | 7/2021 | Jingle et al. |
| 2001/0056544 A1 | 12/2001 | Walker |
| 2003/0001720 A1 | 1/2003 | Wade et al. |
| 2003/0020759 A1 | 1/2003 | Cancilla et al. |
| 2004/0044454 A1 | 3/2004 | Ross et al. |
| 2004/0167689 A1 | 8/2004 | Bromley et al. |
| 2005/0021294 A1 | 1/2005 | Trsar et al. |
| 2005/0038581 A1 | 2/2005 | Kapolka et al. |
| 2005/0060070 A1 | 3/2005 | Kapolka et al. |
| 2005/0182537 A1 | 8/2005 | Tefft et al. |
| 2005/0240555 A1 | 10/2005 | Wilde et al. |
| 2005/0251304 A1 | 11/2005 | Cancellara et al. |
| 2006/0052921 A1 | 3/2006 | Bodin et al. |
| 2006/0106508 A1 | 5/2006 | Liebl et al. |
| 2006/0211446 A1 | 9/2006 | Wittmann et al. |
| 2007/0005201 A1 | 1/2007 | Chenn |
| 2007/0043488 A1 | 2/2007 | Avery et al. |
| 2007/0050105 A1 | 3/2007 | Chinnadurai et al. |
| 2007/0055420 A1 | 3/2007 | Krzystofczyk et al. |
| 2007/0073460 A1 | 3/2007 | Bertosa et al. |
| 2007/0185624 A1 | 8/2007 | Duddles et al. |
| 2007/0233340 A1 | 10/2007 | Raichle et al. |
| 2008/0177438 A1 | 7/2008 | Chen et al. |
| 2008/0269975 A1 | 10/2008 | Bertosa |
| 2008/0280602 A1 | 11/2008 | Ban |
| 2008/0306645 A1 | 12/2008 | Dewhurst et al. |
| 2009/0062978 A1 | 3/2009 | Picard |
| 2009/0118899 A1 | 5/2009 | Carlson |
| 2009/0119657 A1 | 5/2009 | Link, II |
| 2009/0187976 A1 | 7/2009 | Perroud et al. |
| 2009/0265055 A1 | 10/2009 | Gillies |
| 2009/0276115 A1 | 11/2009 | Chen |
| 2010/0042287 A1 | 2/2010 | Zhang |
| 2010/0174446 A1 | 7/2010 | Andreasen et al. |
| 2010/0204878 A1 | 8/2010 | Drew et al. |
| 2010/0205450 A1 | 8/2010 | Sarnacke et al. |
| 2010/0262335 A1 | 10/2010 | Brozovich |
| 2011/0071709 A1 | 3/2011 | Damiani et al. |
| 2011/0112718 A1 | 5/2011 | Claus et al. |
| 2011/0153150 A1 | 6/2011 | Drew et al. |
| 2011/0276218 A1 | 11/2011 | Dwan |
| 2011/0313593 A1 | 12/2011 | Cohen et al. |
| 2012/0046826 A1 | 2/2012 | Panko |
| 2012/0254345 A1 | 10/2012 | Montoya |
| 2017/0277527 A1 * | 9/2017 | Margol .................... G06F 8/61 |
| 2017/0301154 A1 | 10/2017 | Rozint |
| 2020/0219335 A1 * | 7/2020 | Gintz .................. G05D 1/0022 |
| 2020/0234521 A1 * | 7/2020 | Tonsing ............. G07C 9/00817 |

OTHER PUBLICATIONS

Thesis entitled "Remote Connection of Diagnostic Tool" by Irina Elena Apetri and Ali Raza, Chalmers University of Technology, dated 2011.

* cited by examiner

REMOTE VEHICLE DIAGNOSTIC SYSTEM AND METHOD

CROSS REFERENCE TO RELATED APPLICATION

The present application is a divisional of U.S. application Ser. No. 16/842,036, filed on Apr. 7, 2020, now U.S. Pat. No. 11,954,946, which is hereby incorporated by reference herein in its entirety.

BACKGROUND AND FIELD OF THE INVENTION

The present invention is directed to a vehicle diagnostic system and method, and in particular a system and method in which data signals from a vehicle at a repair facility are recorded for transmission and play back to a remote diagnostic computer or scan tool, and correspondingly data signals from the remote diagnostic computer or scan tool are recorded for transmission and play back to the vehicle at the repair facility.

In automotive repair garages, many of the tools used to diagnose and repair cars have transitioned to computer-based systems. Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an aftermarket diagnostic company. The diagnostic software scanning programs are used to diagnose the electronic system of a vehicle.

Repair facilities must diagnose the electronic computer systems of vehicles, including scanning and reprogramming electronic control units of the vehicle electronic computer systems as needed for software updates and/or repairs. Repair facilities may obtain equipment so as to be able to perform such diagnostic operations locally, including by way of local computers utilizing diagnostic software applications for use in scanning, diagnosing and reprogramming the vehicle. However, due to the wide range of vehicle makes and models and changes to the electronic systems of such vehicles, repair facilities may utilize alternative equipment whereby diagnostic and reprograming operations are facilitated via remote diagnostic computer systems utilizing diagnostic software applications, in which case the vehicle will be connected with electronic equipment to facilitate the transmission of vehicle data remotely, such as via the Internet. In the case of remote operations it is necessary that the exchange of information between the electronic system of the vehicle and the remote diagnostic systems is maintained in order to properly scan, diagnose and reprogram the vehicle.

SUMMARY OF THE INVENTION

The present invention provides a vehicle diagnostic system and method in which data signals from a vehicle at a repair facility are recorded for transmission and play back to a remote diagnostic tool, and correspondingly data signals from the remote diagnostic tool are recorded for transmission and play back to the vehicle at the repair facility.

According to an aspect of the present invention a method for performing a vehicle diagnostic process for diagnosing, scanning and/or programming a vehicle includes recording a diagnostic message from a diagnostic computer device to generate a recorded diagnostic message, wherein the diagnostic message comprises diagnostic data signals from the diagnostic computer device, and transmitting the recorded diagnostic message to a local computer at a repair facility located remotely from the diagnostic computer device. The method further includes playing the recorded diagnostic message at the local computer for delivery via an interface device to an electronic system of a vehicle, and recording with the local computer a vehicle message from the electronic system of the vehicle to generate a recorded vehicle message generated in response to playing of the recorded diagnostic message, and where the vehicle message comprises vehicle data signals from the electronic system recorded with the local computer via the interface device. The method also includes transmitting the recorded vehicle message from the local computer to the remote diagnostic computer device.

The process steps are repeated until completion of the vehicle diagnostic process, including diagnosing, scanning and/or programming of the electronic system of the vehicle, where the transmission of the recorded diagnostic and/or vehicle messages may be by way of an Internet connection.

According to particular embodiments, transmitting the recorded vehicle message from the local computer to the diagnostic computer device comprises transmitting the recorded vehicle message to a remote computer that is operably connected for communication with the diagnostic computer device, and includes playing the recorded vehicle message at the remote computer for delivery to the diagnostic computer device.

In a further embodiment the diagnostic computer device is a scan tool that includes a diagnostic application program operable to generate diagnostic data signals. As such, recording of the diagnostic messages may include recording the diagnostic message with a remote computer that is operably connected for communication with the scan tool. Still further, a remote interface device may be disposed for communications between the remote computer and the scan tool.

In a further embodiment, a method for performing a vehicle diagnostic process for diagnosing, scanning and/or programming a vehicle includes recording a diagnostic message from a scan tool with a remote computer to generate a recorded diagnostic message at a diagnostic center, wherein the scan tool includes a diagnostic application program and the diagnostic message comprises diagnostic data signals from the diagnostic application program of the scan tool. The method also includes transmitting the recorded diagnostic message from the remote computer to a local computer at a repair facility via an Internet connection, and playing the recorded diagnostic message at the local computer for delivery via an interface device to an electronic system of a vehicle. The method also includes recording with the local computer a vehicle message from the electronic system of the vehicle to generate a recorded vehicle message generated in response to playing the recorded diagnostic message, transmitting the recorded vehicle message from the local computer to the remote computer, and playing the recorded vehicle message at the remote computer for delivery to the scan tool. The steps of the method may be repeated until completion of the vehicle diagnostic process.

In yet another embodiment, a method for performing a vehicle diagnostic process for diagnosing, scanning and/or programming a vehicle includes recording a plurality of diagnostic messages from a scan tool for a first vehicle, where each diagnostic message comprises diagnostic data signals from a diagnostic application program of the scan tool, transmitting the plurality of diagnostic messages to a local computer at a repair facility, and storing the plurality of diagnostic messages at the local computer. The method further includes playing sequentially the plurality of diagnostic messages at the local computer for delivery via an interface device to an electronic system for a second vehicle, and receiving with the local computer a vehicle message from the electronic system of the second vehicle in response to each sequentially played diagnostic message, where each vehicle message is generated in response to a prior played diagnostic message, and where a subsequent diagnostic message is played after receipt by the local computer of a vehicle message generated in response to the prior played diagnostic message.

The diagnostic system and method in accordance with the present invention employing recorded responsive diagnostic and vehicle signals is operable to diagnose, scan and/or re-program an electronic system of a vehicle where the exchange of signals between a diagnostic computer device such as a scan tool and a remotely located vehicle is not in real-time such that the process is insulated from corruption due to disruptions or delays in transmissions. As such, the diagnostic process for diagnosing, scanning and/or re-programing of the remote vehicle is more robust and less likely to require starting over or repetition, which is otherwise highly problematic because such diagnostic processes can be time consuming. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
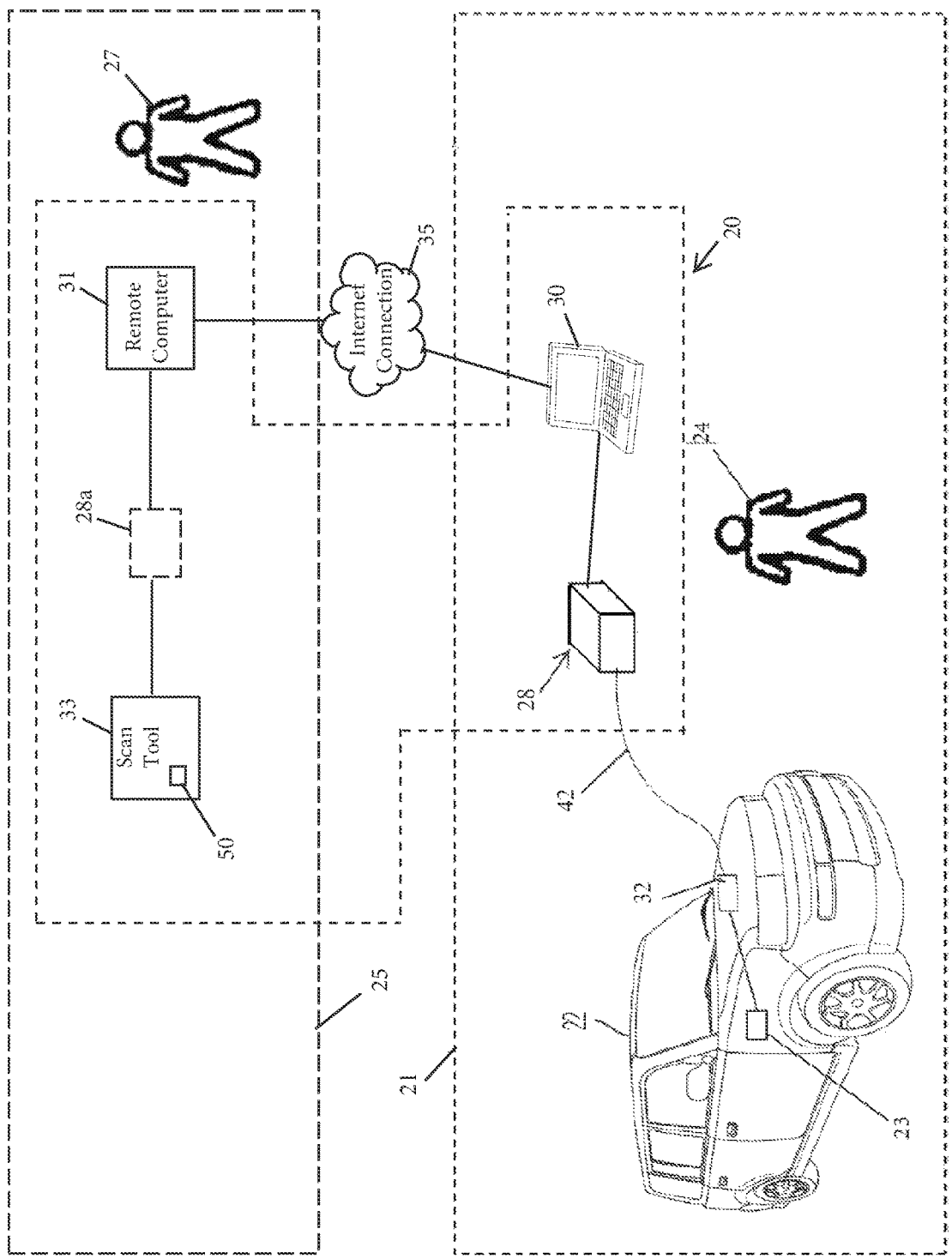
FIG. 1 is a schematic illustration of a vehicle diagnostic system in use with a vehicle in accordance with the present invention utilizing recorded and played back data signals between a repair facility and a remote diagnostic center.
Figure 2:
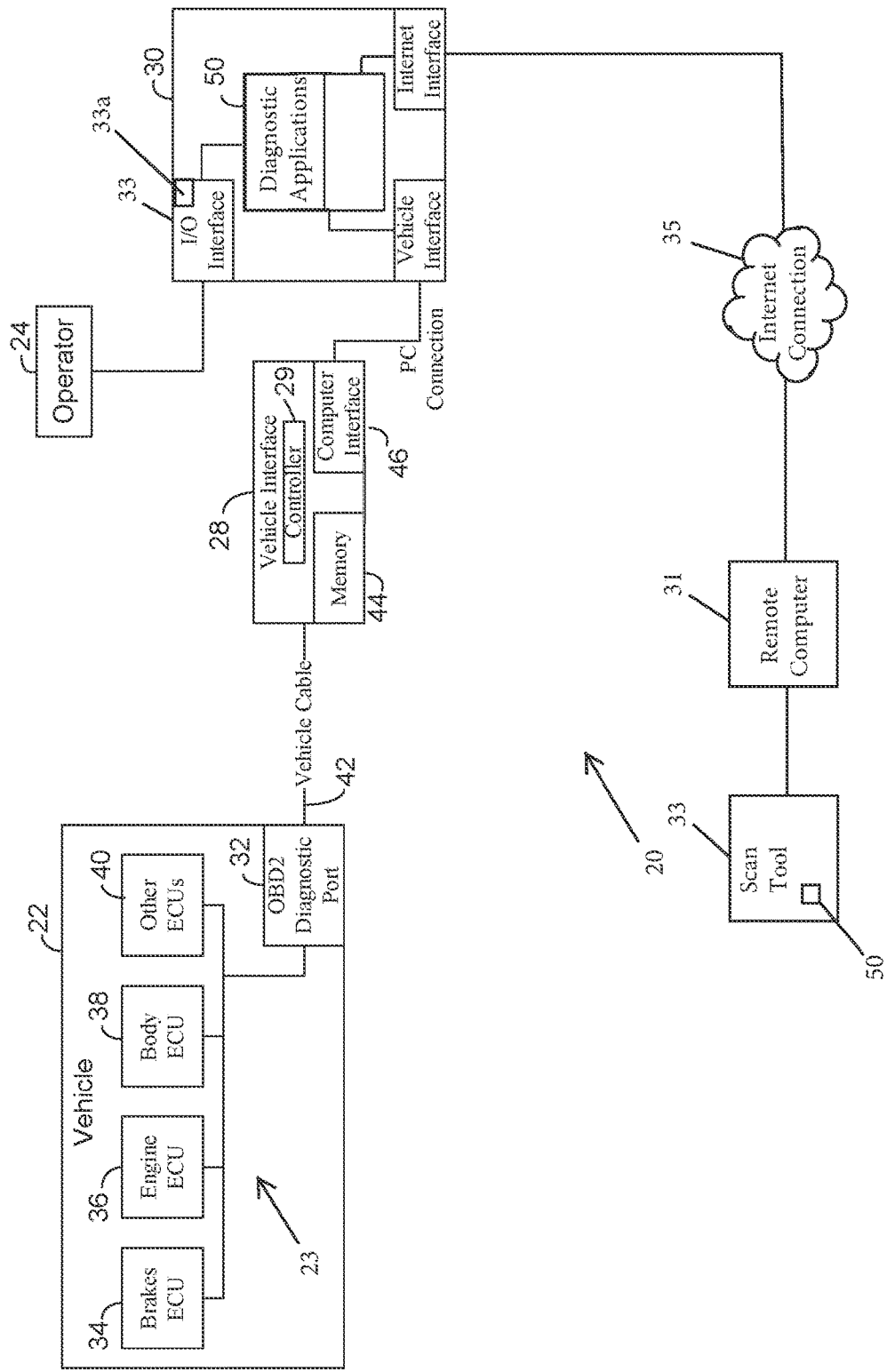
FIG. 2 is a detailed block diagram of the local computer, vehicle interface and vehicle electronic system in communication with the remote computer and diagnostic scan tool of FIG. 1.

With reference to FIGS. 1 and 2, a remote vehicle diagnostic system 20 is shown for use with a vehicle 22, where system 20 includes both local equipment at a repair facility 21 that is utilized by a mechanic or operator 24 and remote equipment at a diagnostic center 25 that is accessed by a remote technician 27 for remotely scanning, diagnosing and programming the electronic system 23 of vehicle 22. Local equipment is illustrated as including a vehicle diagnostic tool, referred to as a vehicle interface device or interface tool 28 that is communicatively coupled to a local computer 30, by way of a USB cable or wireless connection, where computer 30 may be a laptop, handheld, tablet or other such computing device. In use, vehicle interface device 28 is also connected with vehicle 22 by operator 24, such as by connecting to an on-board diagnostic ("OBD") diagnostic port 32 of the vehicle 22 in order to scan, diagnose and program the electronic system 23 of vehicle 22. Diagnostic center 25, in turn, includes a remote computer 31 and, in the illustrated embodiment, a diagnostic computer device that comprises a conventional scan tool 33. In operation, vehicle data signals from the electronic system 23 of vehicle 22 are recorded by local computer 30 and transmitted, such as via an Internet connection 35 to remote computer 31, which in turn provides or plays the recorded vehicle data signals to the scan tool 33. Correspondingly and simultaneously, diagnostic data signals from scan tool 33 are recorded by remote computer 31 and transmitted via Internet connection 35 to local computer 30, which in turn provides or plays the recorded diagnostic data signals to the electronic system 23 of vehicle 22 via interface device 28. In this manner, scan tool 33 is operable for use in scanning, diagnosing and programming the electronic system 23 of vehicle 22 where the exchange of signals occurs via recordings of data signals and thus is not in real-time such that the process is insulated from corruption due to disruptions or delays in transmissions.

Remote diagnostic system 20 is operable to scan, diagnose and program various vehicle electronic control units (ECUs) of electronic system 23, such as an engine ECU 34, body ECU 36, brakes ECU 38, and/or other ECUs 40, and/or other electronic parts and components of vehicle 22. Vehicle interface device 28 connects with port 32, such as via vehicle cable 42, and includes a controller 29, such as in the form of a processor or micro-processor and interface circuitry to facilitate communication between the ECUs and the interface tool 28, with interface tool 28 including a database of vehicle protocols found in a local memory 44 that allow communication with the ECUs of various makes and models of vehicles. In the illustrated embodiment interface device 28 comprises a pass-thru interface device that operates in accordance with the SAE J2534 standard. Vehicle interface device 28 additionally includes a computer interface 46 for connection with computer 30, such as via standard interfaces, such as USB, Bluetooth, Wi-Fi, or the like. Vehicle diagnostic system 20 may be configured to be selectively operable in one of a plurality of different modes, whereby a technician may use the interface device 28 for vehicle maintenance, diagnosis, programming and repair as needed. In operation, the interface device 28 receives vehicle signals from the electronic system 23 in the vehicle protocol and converts those signals to signals defined by the J2534 specification and in turn passes them to the local computer 30. Correspondingly, local computer 30 provides diagnostic data signals received from scan tool 33 and provides them to interface device 28 in the J2534 format, with interface device 28 converting the diagnostic data signals to the vehicle protocol for transmission to electronic system 23. It should be appreciated that a diagnostic process between scan tool 33 and electronic system 23 may involve scanning, diagnosing and/or re-programming of the electronic system 23, such as of one or more ECU's.

As noted, remote computer 31 is accessible via Internet connection 35, whereby one or both of vehicle interface device 28 and local computer 30 may be connected to the remote computer 31, with remote computer 31 in turn interfaced with scan tool 33. Scan tool 33 comprises a computer device with a processor and software, and includes one or more diagnostic applications 50 used to scan, diagnose and reprogram electronic system 23, where a given scanning program is run depending on, for example, the make, model and year of vehicle 22. Remote technician 27 may access computer 31 for aiding in performing a vehicle diagnostic evaluation of vehicle 22 by running a diagnostic scan of the electronic system 23 using a diagnostic application program 50. In particular embodiments the remote equipment may additionally include an interface device 28*a* at the remote diagnostic center 25 that is operably connected for communication with the remote computer 31 and scan tool 33, where interface device 28*a* is similarly configured and operable to interface device 28 as a pass-thru device in accordance with the SAE J2534 standard. In such an embodiment, the remote interface device 28*a* operates to convert J2534 signals received from computer 31 to a vehicle protocol for transmission to the scan tool 33, as well as convert vehicle protocol signals received from scan tool 33 into J2534 signals for delivery to computer 31. Still further, remote computer 31 may itself be operable, such as by way of hardware and software, to provide signals to and receive signals from scan tool 33 in the J2534 protocol. Remote computer 31 may be connected with scan tool 33 or remote interface device 28*a* by way of cables, such as USB cables. It should be appreciated that although in the illustrated embodiment a separate diagnostic computer device in the form of scan tool 33, separate remote interface device 28*a*, and separate computer 33 are show, that in an alternative embodiment such components may be integrated into a computer system, such as a desktop computer, server, or the like.

Figure 3:
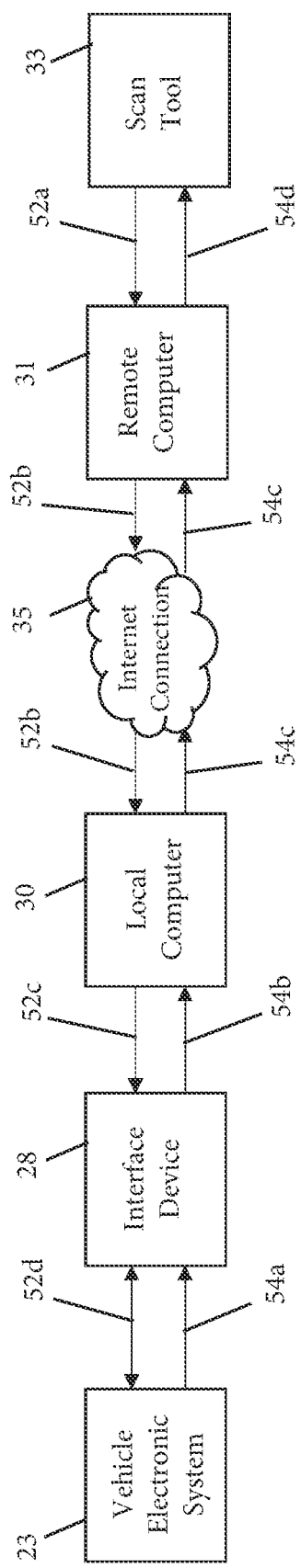
FIG. 3 is a schematic illustration of the exchange of data signals between the local repair facility and remote diagnostic center.

In operation for the scanning, diagnosing and/or programming of electronic system 23 of vehicle 21, data signals are exchanged between scan tool 33 and electronic system 23. As understood from FIG. 3, diagnostic data signals 52 are provided from scan tool 33 to electronic system 23, and vehicle data signals 54 are provided from electronic system 23 to scan tool 33. In the illustrated embodiment, diagnostic data signals 52 are illustrated as 52*a*, 52*b*, 52*c* and 52*d* as respectively transmitted from scan tool 33, to remote computer 31, to local computer 30 over Internet connection 35, to interface device 28, and to electronic system 23. Correspondingly, vehicle data signals 54 are illustrated as 54*a*, 54*b*, 54*c* and 54*d* as respectively transmitted from electronic system 23, to interface device 28, to local computer 30, to remote computer 31 over Internet connection 35, and then to scan tool 33.

The diagnostic data signals 52 and corresponding vehicle data signals 54 comprise responsive exchanged data messages. For example, diagnostic data signals 52 transmitted to electronic system 23 may comprise request messages or codes to determine status of the electronic system 23, or may comprise request messages or codes sent by scan tool 33 to obtain information such as diagnostic trouble codes (DTCs), data readings, or the like from electronic system 23, as well as require confirmation of processing steps from electronic system 23. In response, electronic system 23 provides the vehicle data signals 54 to scan tool 33. The diagnostic data signals 54 provided by scan tool 33 may additionally comprise programming information by which one or more ECUs of electronic system 23 may be re-programmed or re-flashed. It should be appreciated that each of the messages or codes of the respective diagnostic data signals 52 and corresponding vehicle data signals 54 comprise a discrete series of signals such as made up of bytes.

In operation, rather than transmitting an ongoing stream of data between the repair facility 21 and diagnostic center 25 via Internet connection 35, which can be susceptible to disruptions, the system and method of the present invention includes recording data signals comprising a discrete message, with the recorded message then being transmitted at one time, thereby providing a more robust exchange of messages. In particular, a series of diagnostic data signals 52 from scan tool 53 making up a particular diagnostic message is transmitted to and recorded by remote computer 31. Upon recording of the entirety of the discrete diagnostic message from scan tool 53, remote computer 31 then transmits the recorded diagnostic message via internet connection 35, such as via TCP/IP, to local computer 30, which in turn plays the recorded diagnostic message to electronic system 23 via interface device 28. In response to the playing of the recorded diagnostic message to electronic system 23, electronic system 23 responds by transmitting a vehicle message comprising a series of vehicle data signals 54 to local computer 30 via interface device 28. Local computer 30, in like manner to remote computer 31, operates to record the entirety of the vehicle data signals 54 forming the discrete vehicle message. Upon recording of the entirety of the discrete vehicle message from electronic system 23, local computer 30 then transmits the recorded vehicle message via internet connection 35, such as via TCP/IP, to remote computer 31, which in turn plays the recorded vehicle message to scan tool 33. This process proceeds until completion of a given scanning, diagnosing and/or reprogramming operation. It should be appreciated that diagnostic data signals 52 making up a diagnostic message may comprise re-programming or re-flashing data, such as for one or more ECUs of electronic system 23.

The recording of discrete diagnostic messages comprising diagnostic data signals 52, such as for a given request or command from scan tool 33, for transmission and play back to the electronic control system 23, and the recording of responsive discrete vehicle messages made up of vehicle data signals 54 for transmission and play back to the scan tool 33 provides a robust system and method for remotely scanning, diagnosing and/or programming the electronic system 23. As noted, scan tool 33 is thus operable to scan, diagnose and program the electronic system 23 of vehicle 22 where the exchange of signals occurs via recordings of data signals and is thus not in real-time such that the process is insulated from corruption due to disruptions or delays in transmissions.

It should be appreciated that the recorded diagnostic messages and responsive recorded vehicle messages may be maintained on the remote computer 31 and local computer 30. As such, in the event that a disruption does occur in the exchange of recorded messages between the vehicle 22 and the scan tool 33, such as due to a disruption in the Internet connection 35 or otherwise, the recorded diagnostic messages and/or vehicle messages may be used to recover the scan, diagnose and/or programming process and/or re-start the process. It should be appreciated that the diagnostic messages comprising diagnostic data signals 52 may comprise messages for scanning, diagnosing and/or programming electronic system 23, and in particular one or more ECUs of electronic system 23.

Still further, in a particular embodiment, upon recording diagnostic messages from scan tool 33 for a given scan, diagnostic and/or programming process for a given vehicle 22, such as by make, model and year, the recorded diagnostic messages may be used to perform the same process on a similar vehicle, such as another vehicle of the same make, model and year. For example, a series of discrete recorded diagnostic messages may be loaded or stored in memory on local computer 30. Local computer 30 may then sequentially play the recorded diagnostic messages for the given scan, diagnostic and/or programming process that is to be performed, with the electronic system 23 of the other vehicle 22 than providing vehicle messages in response thereto. In this manner, scan results may thus be obtained without connection to or direct use of scan tool 33. The resulting vehicle messages may be transmitted to the remote diagnostic center 25, such as to a remote computer 31 for processing and analysis.

As understood from FIG. 1, remote technician 27 may use remote computer 31 for aiding in performing a vehicle diagnostic evaluation of vehicle 22 by running a diagnostic scan of the electronic system 23 using a diagnostic application program 50. Accordingly, remote computer 31 may be used to operate local computer 30 independent from actions by a local operator, such as mechanic 24. It should be appreciated that although in the illustrated embodiment the local computer 30 is disclosed as a laptop that alternative computers may be employed within the scope of the present invention, including tablets, custom handheld computer devices, and the like, where such a computer device may include one or more processors, memory for storage of programs, and a screen or be linked to a screen.

In the illustrated embodiment of FIGS. 1 and 2, vehicle interface device 28 and local computer 30 are shown as separate components making up a local computer system, that is with local computer 30 being proximate at the repair facility 25 such that it is proximate the vehicle 22. In an alternative arrangement, interface device 28 and computer 30 may be integrated in a single computer device, which would likewise be proximate the vehicle at the repair facility.

Other changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privlege is claimed are defined as follows:

1. A method for performing a vehicle diagnostic process for diagnosing, scanning and/or programming a vehicle, said method comprising:
    recording a plurality of diagnostic messages from a scan tool for a first vehicle, wherein each diagnostic message comprises diagnostic data signals from a diagnostic application program of the scan tool;
    transmitting the plurality of diagnostic messages to a local computer at a repair facility, and storing the plurality of diagnostic messages at the local computer;
    playing sequentially the plurality of diagnostic messages at the local computer for delivery via an interface device to an electronic system for a second vehicle;
    receiving with the local computer a vehicle message from the electronic system of the second vehicle in response to each sequentially played diagnostic message, wherein each vehicle message is generated in response to a prior played diagnostic message, and wherein a subsequent diagnostic message is played after receipt by the local computer of a vehicle message generated in response to the prior played diagnostic message.

2. The method of claim 1, wherein the scan tool operatively communicates with a remote computer, and wherein the scan tool and remote computer are located remotely from the local computer, and wherein said recording the plurality of diagnostic messages from the scan tool for a first vehicle comprises recording the plurality of diagnostic messages from the scan tool with the remote computer.

3. The method of claim 2, further including a remote interface device, and wherein the scan tool and the remote computer operatively communicate via the remote interface device.

4. The method of claim 1, further comprising transmitting the vehicle messages received by the local computer to a remote computer.

5. The method of claim 4, further comprising recording the vehicle messages received by the local computer prior to transmitting the vehicle messages to the remote computer, wherein transmitting the vehicle messages to the remote computer comprises transmitting recorded vehicle messages.

* * * * *